United States Patent [19]

Gibbon et al.

[11] Patent Number: 5,283,927
[45] Date of Patent: Feb. 8, 1994

[54] SILICON RUBBER WIPER BLADE WITH LOW COEFFICIENT OF FRICTION

[75] Inventors: Robert M. Gibbon; Michael L. Hyer, both of Fort Worth, Tex.

[73] Assignee: JMK International, Inc., Fort Worth, Tex.

[21] Appl. No.: 708,245

[22] Filed: May 31, 1991

[51] Int. Cl.⁵ .................................. B60S 1/02
[52] U.S. Cl. .................. 15/250.36; 15/250.42; 428/325; 428/330; 428/331; 428/447; 524/267; 524/268; 524/425; 524/493; 524/588; 528/32
[58] Field of Search ............... 524/267, 268, 425, 493, 524/588; 528/32; 428/325, 330, 331, 447; 15/245, 250.36, 250.42

[56] References Cited

U.S. PATENT DOCUMENTS

| | | | |
|---|---|---|---|
| D. 212,743 | 11/1968 | Roberts | D14/6 |
| 3,116,506 | 1/1964 | Browne et al. | 15/250.36 |
| 3,281,515 | 10/1966 | Schmitz | 264/236 |
| 3,539,671 | 11/1970 | Nauta | 264/102 |
| 3,566,432 | 3/1971 | Quinlan et al. | 15/250.36 |
| 3,903,560 | 9/1975 | Jewell et al. | 15/250.42 |
| 4,046,983 | 9/1977 | Ishino et al. | 219/10.55 D |
| 4,103,385 | 8/1978 | Porter | 15/250.36 |
| 4,268,574 | 5/1981 | Peccenini et al. | 428/315 |
| 4,360,610 | 11/1982 | Murray et al. | 523/212 |
| 4,552,713 | 11/1985 | Cavicchioli et al. | 264/162 |
| 4,904,434 | 2/1990 | Hyer | 264/146 |
| 4,914,717 | 4/1990 | Gibbon | 219/10.55 M |
| 4,981,637 | 1/1991 | Hyer | 264/146 |

Primary Examiner—Paul J. Thibodeau
Assistant Examiner—D. S. Nakarani
Attorney, Agent, or Firm—Jefferson Perkins

[57] ABSTRACT

A windshield wiper blade capable of inexpensive manufacture and having good wipe quality comprises approximately 100 parts by weight of a vulcanizable elastomer including at least one silicone polymer, and about 75 to 220 parts by weight of a siliceous filler dispersed in the elastomer. The siliceous filler preferably includes a substantial portion of particles having a relatively large diameter in the range of 5 to 100 microns in order to lower the coefficient of friction of the wiper blade with respect to automotive windshield glass.

37 Claims, 4 Drawing Sheets

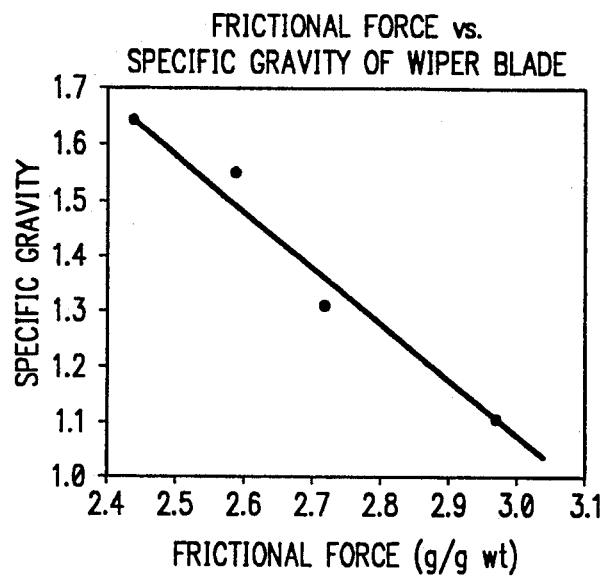
FIG. 1
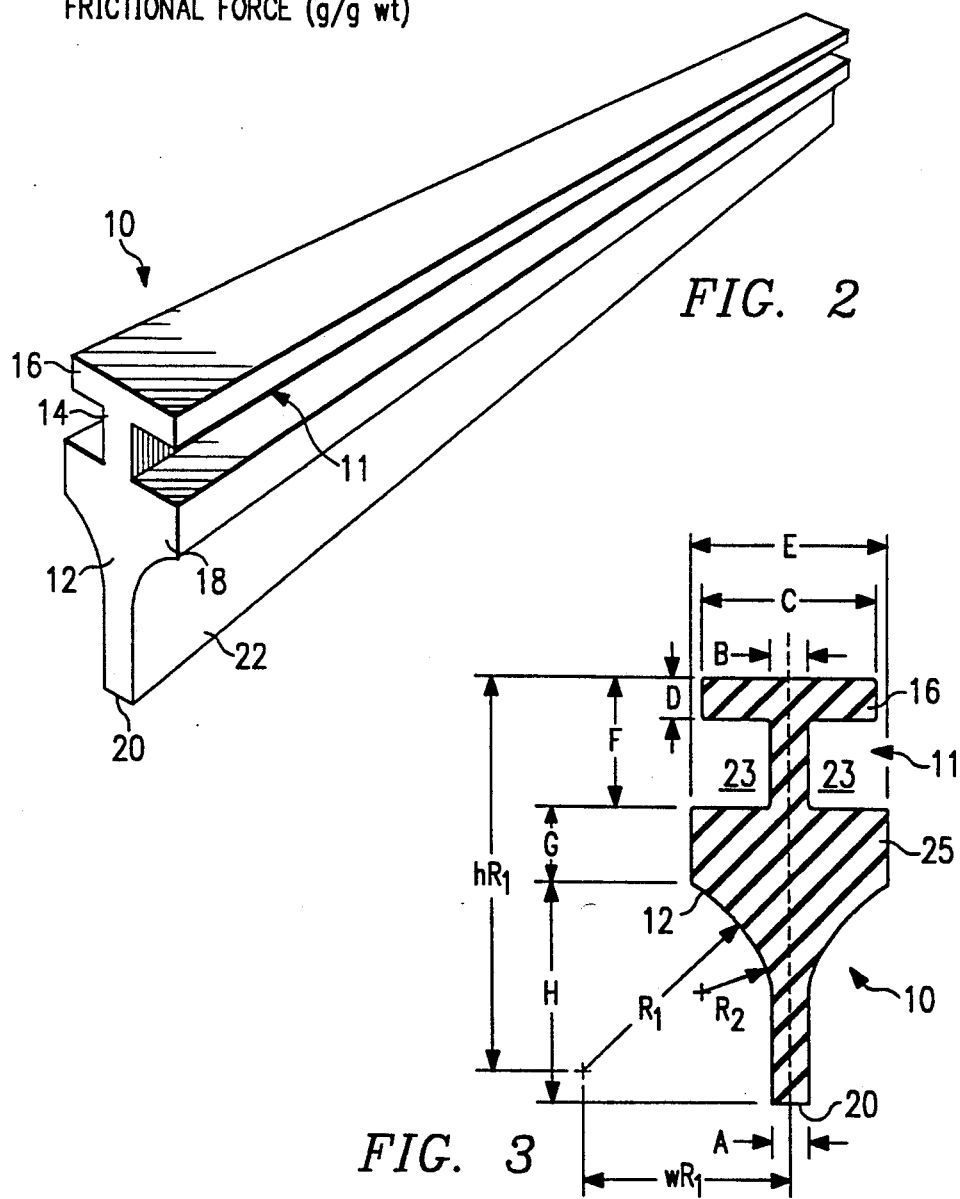
FIG. 2
FIG. 3

SILICON RUBBER WIPER BLADE WITH LOW COEFFICIENT OF FRICTION

TECHNICAL FIELD OF THE INVENTION

This invention relates in general to windshield wiper blades and, more particularly, to an improved silicone wiper blade having a proper coefficient of friction and yet capable of inexpensive manufacture.

BACKGROUND OF THE INVENTION

Rain, sleet and snow having always presented a vision problem for the driver of a moving vehicle. The windshield wiper blade has attempted to minimize the problem by clearing the windshield of the light obstructing moisture. Such blades are typically formed of rubber or rubber-like materials. Over the years, wiper blades have been modified in many ways in order to enhance wipe quality and therefore visibility during precipitation. In some instances, the configuration of the blade has been changed to give a plurality of contact surfaces on the blade. Various modifications have been introduced to improve the consistency and integrity of the wiping edge.

Workers in the wiper field have made prior attempts to use silicone rubber as a base for a wiper blade composition, but without notable success. This is because as a material, silicone rubber is superior to natural or other synthetic rubbers for several reasons. Silicone rubber, i.e., high molecular weight, vulcanizable polydiorganosiloxane, is able to withstand wide temperature variations without an appreciable effect on its physical properties. Further, silicone rubber is virtually unaffected by ultraviolet radiation, even over long periods of time. It is also resistant to ozone, oil, salt, water and other road and automotive chemicals. If silicone rubber compositions could be used for wipers, they would have the ability to resist compression set and withstand solar radiation, chemicals, ozone, water, oil and salt without adverse effects. Thus, if commercially manufacturable silicone wipers were possible, such wipers would have a much longer life than conventional natural rubber wipers now in general use.

Silicone rubber as used for wiper compositions has had one significant drawback: it has an unacceptably high coefficient of friction with respect to glass. In preliminary testing by at least one worker in the field, silicone wipers exhibited such a high coefficient of friction that they tore loose from the wiper arms instead of wiping the windshield. Less catastrophic effects of this high coefficient of friction include an unacceptably loud squeak or chatter as the wiper traverses the windshield, and unacceptably high loads on the windshield wiper motor.

U.S. Pat. No. 4,904,434 (hereinafter, "the '434 Patent") and U.S. Pat. No. 4,981,637 (hereinafter, "the '637 Patent"), both to Hyer (together, the "Hyer Patents"), disclose a method of forming an improved wiper blade utilizing an extrusion process. In this method, a continuous length of curable elastomer is extruded through a die having a die opening which is shaped to produce a pair of wiper blades joined at a mid-section thereof in edge-to-edge relation. The '434 Patent discloses a method of scoring the mid-section of the continuous length of the extruded elastomer and the '637 Patent teaches preforming the mid-section to produce a weakened mid-section. In both cases, the extruded elastomer is then cured and, thereafter, the length is separated into two separate lengths of wiper blade by dividing the length either along the score line (the '434 Patent) or along the preformed mid-section (the '637 Patent).

In addition to the disclosure of a method of forming a wiper blade using an extrusion process, the Hyer patents disclose a silicone rubber composition for such wiper blades. These compositions are disclosed as containing about 100 parts silicone polymer, about 40 parts filler, from about 0.5 to 2.0 parts vulcanizing and 0 to 10 parts of other enhancement additives. The polysiloxane polymers are further disclosed as having methyl and vinyl organic groups, with the vinyl level being in the range of 0 to 5 mole percent. The fillers are specified as including fumed silica, precipitated silica, ground quartz, calcium carbonate and iron oxide. The Hyer patents fail to specify the relative amounts of these different filler components.

One conventional method to measure the amount of silica filler in a wiper blade is its specific gravity. It has been found that the Hyer wiper blades above described typically have a specific gravity of 1.1 to 1.2. Such wiper blades still exhibit a relatively high coefficient of friction with respect to glass, making them less than optimally suited for commercial use.

U.S. Pat. No. 3,972,850 to Hamilton (hereinafter "Hamilton") discloses a windshield wiper blade comprising silicone elastomer, dispersed filler and an additive which imparts lubricant and hydrophobic characteristics to a windshield. The polymerized silicone elastomer in Hamilton comprises approximately 3 to 20 parts dispersed filler selected from silica, mica, molybdenum disulfide and tetrafluoroethylene, and approximately 0.2 to 10 parts of either dicoco dimethyl ammonium chloride or a di[(n-hydroxy)polydimethyl-siloxanyl]n-(diethylamino) methylsilane copolymer. The Hamilton reference states that amounts of silica filler over 20 parts by weight are unsatisfactory for wiper blades.

While Hamilton discloses a composite silicone rubber material capable of imparting hydrophobic properties to windshields, Hamilton's composition is not economically feasible for mass manufacture due to Hamilton's use of exotic and expensive additives. Additionally, Hamilton uses an expensive molding technique to form the wiper blade. Further, Hamilton does not teach a wiper blade physical structure. The surface area of contact with the windshield, and therefore the profile of the wiper blade, must vary as the composition of the blade is varied in order to yield the same frictional force when the wiper blade is applied to glass.

In view of these prior art attempts, a long felt need continues to exist for an improved windshield wiper blade that is capable of inexpensive manufacture; that has an improved edge that provides a clean and unobstructed view; that has low temperature flexibility providing easy release from ice collecting on the blade; that has improved weatherability providing a surface impervious to ultraviolet and ozone decay and unaffected by environmental temperature extremes; that has hydrophobic properties; that has increased wiper durability; and that has resistance to salt and acid rain corrosion. A need has also existed in the industry for wiper blades capable of accepting non-black colorants. Conventional, natural rubber wiper blades are colored black in order to protect the wiper blades from harmful ultraviolet radiation. Windshield wiper blades having light or bright colors have not therefore been commercially acceptable in the past.

SUMMARY OF THE INVENTION

According to one aspect of the invention, a silicone windshield wiper blade is provided that is capable of inexpensive manufacture and that has good wipe quality. The wiper blade includes about 100 parts by weight of a vulcanizable silicone polymer elastomer, and about 75 to 220 parts by weight of a siliceous, calcareous or other mineral filler dispersed in the elastomer. Preferably, the elastomer includes at least one polydiorganosiloxane and even more preferably, the polydiorganosiloxane has organo side groups consisting of between 0.02 and 1.00% vinyl, and the remainder methyl. In a particularly preferred composition, the elastomer includes a major portion of dimethylvinylsiloxy-ended polydiorganosiloxane, with the organo side groups thereof consisting of 0.1 to 0.3 weight percent vinyl and the remainder methyl, and a minor portion of dimethyl-vinyl-siloxy-ended polydimethylsiloxane.

The filler preferably includes between 3 and 55 parts by weight (relative to 100 parts by weight of the elastomer) of small siliceous particles having a particle size of less than or equal to five microns. These small siliceous particles can be selected from the group consisting of fumed silica, precipitated silica and mixtures thereof. The small particles can consist entirely of fumed silica with these particles having a surface area of about 200 square meters per gram and present in concentrations of 3 to 55 parts by weight relative to 100 parts by weight of the elastomer. Some or most of the fumed silica can be replaced by precipitated silica.

The filler also preferably includes larger siliceous or calcareous particles in the range to 5 to 100 microns, and more preferably, 5 to 30 microns. Such larger particles can be selected from, for example, ground quartz, chalk and celite. The small siliceous particles provide reinforcement for the composition, while the large siliceous or calcareous particles reduce the coefficient of friction to a point that the resultant silicone rubber wiper has an acceptable coefficient of friction with respect to automotive glass.

Preferably, a third silicone polymer, hydroxyl-ended polydimethylsiloxane having a molecular weight between 1000 and 10,000 and a viscosity of between 5 and 100 centistokes, is added as a process aid. The ratio by weight of the small siliceous particles to this third polymer should preferably be in the range of 3 to 1 to 12 to 1, and most preferably is approximately 6 to 1.

Compositions according to the invention will also typically include small portions of one or more of the following: silane, a cerium stabilizer such as cerium octoate, an anti-acid additive, a vulcanization catalyst such as 2,4-dichlorobenzoylperoxide, dicumylperoxide or one of the platinum catalysts, and pigment.

With some of the compositions of the invention, the wiper blade may be prepared by extruding a continuous length of curable silicone polymer elastomer through a die having a die opening which is shaped to produce a pair of wiper blades joined at a mid-section thereof in edge-to-edge relation. The mid-section of the continuous length of the extruded silicone polymer is then either scored or preformed to produce a weakened mid-section. The continuous length of extruded silicone polymer is then cured and thereafter the length of the extrudate is separated into two separate lengths of wiper blade by pulling the length of continuous elastomer apart along the weakened mid-section. The separate lengths of wiper blade can then be cut into individual wiper-sized segments of any desired length. The extrusion process provides a method of inexpensive manufacture, yet when using the composition of the invention, produces a wiper blade of superior edge quality.

The present invention confers several technical advantages over the prior art which yield a commercially acceptable silicone wiper blade for the first time. Silicone wiper blades prepared according to the invention are much more durable than natural rubber blades, and will provide good wipe quality for at least the average life of the car on which they are mounted. Because the wiper blades according to the invention have a significantly reduced coefficient of friction with respect to glass, they do not encounter the problems of prior art silicone wiper blades in pulling out of the spines, excessive squeak or chatter, and excessive windshield wiper motor loading. The silicone wiper blades disclosed herein may be sufficiently inexpensively manufactured that they will be commercially acceptable. Finally, the use of silicone polymer as a substrate allows the addition of bright colorants, as the use of black or dark pigments for ultraviolet protection is no longer necessary.

BRIEF DESCRIPTION OF THE DRAWINGS

Further aspects of the invention and their advantages may be discerned from reading the following detailed description and/or calcareous when taken in conjunction with the drawings in which:

FIG. 1 is a graph showing the relationship of wiper blade specific gravity to frictional force with respect to glass;

FIG. 2 is a perspective view of a first embodiment of a wiper blade according to the invention;

FIG. 3 is a cross-sectional view of the wiper blade shown in FIG. 2;

DETAILED DESCRIPTION OF THE INVENTION

Composition

Figure 4:
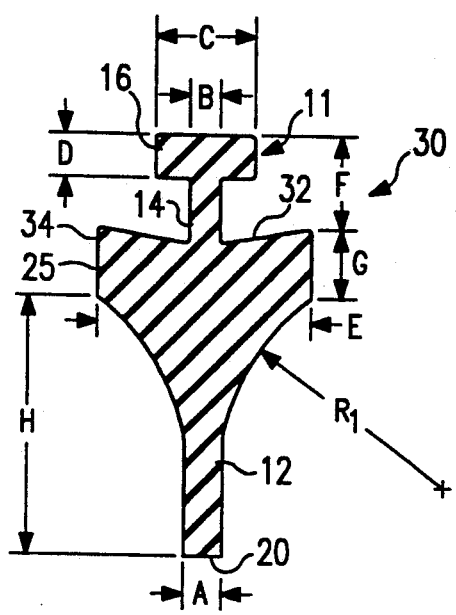
FIG. 4 is a cross-sectional view of a second embodiment of a wiper blade according to the invention.

Wiper blades according to the invention are manufactured using a silicone elastomer gum with a high proportion of siliceous and/or calcareous fillers therein. To make up the silicone polymer gum, one or more polydiorganosiloxanes may be used. The polydiorganosiloxanes should have a very major portion, such as at least 99%, of saturated side groups, and a very minor portion of unsaturated side groups. For example, the side groups of the silicone polymers can, taken together, constitute 99.9 weight percent methyl side groups, and 0.1% vinyl side groups. The percentage of vinyl in general may range from 0.02 to 1 weight percent, and preferably falls between 0.1 and 0.3 weight percent.

Preferably, the silicone polymer elastomer includes a blend of two high molecular weight silicone polymers: dimethylvinylsiloxy-ended polydiorganosiloxane, with the organo side groups consisting of 99.8 weight percent methyl and 0.2% vinyl, and a minor portion of dimethylvinylsiloxy-ended polydimethylsiloxane. The first component of this polymer blend, that is, the one with vinyl side groups, may range in weight percent between 55 and 76 parts where both constituents total 100 parts, while the second component may range in weight percent between 24 and 45 percent. These two constituents typically have molecular weights of about one million, and viscosities in excess of 500,000 centistokes.

The polymer blend or gum also preferably includes a hydroxyl-ended polydimethylsiloxane having a much lower molecular weight in the range of 1000 to 10,000, and a viscosity in the range of 5 to 100 centistokes. This third component of the gum is added as a function of the amount of small siliceous reinforcing particles, as will be hereinafter described. The third constituent may be present in the final gum in the range of about 3 to about 10 parts by weight, where once again the two main silicone polymer constituents total 100 parts. Hereinafter, the term "pph" will be used to denote "parts per hundred", or a number of parts by weight relative to 100 parts by weight of the combined high molecular weight polydiorganosiloxanes.

Silicone polymers using side groups other than methyl and vinyl can also be used. For example, where flexibility in extremely low temperatures is desired, a small portion of phenyl groups may be included in one or both of the two major high molecular weight constituents of the gum. Phenyl side groups may be present on one or both of the major silicone polymer constituents at approximately 5 mole percent. This would take the enbrittlement point of the final wiper from 100° F. to 130° F. Wipers for aircraft, for example, would include silicone polymers having a small proportion of phenyl side groups.

The silicone wiper compositions according to the invention include an unusually high component of siliceous and/or calcareous or other filler. Surprisingly, these high concentrations of fillers, especially when used in conjunction with the manufacturing process according to the invention, yield wiper blades having a low coefficient of friction and good wipe quality. The fillers should be present in the gum in concentrations of between 75 and 220 pph. This filler may include from 25 to 200 pph of a large particulate filler having an average diameter of 5 to 100 microns. Such a large particulate filler can, for example, comprise any of several refractory oxides, such as ground quartz, celite (diatomaceous earth), chalk and other siliceous and calcareous minerals, ferrites, alumina and other, and mixtures thereof. The particulate size of this large particulate component of the filler is preferably in the range of 5 and 30 microns. Ground quartz is a particularly preferred constituent for the large particulate filler component.

A second component of the filler has a much smaller size, on the order of 5 microns or smaller. The filler may comprise from 20 to 55 pph of a refractory oxide or mineral, such as fumed or precipitated silica. It is particularly preferred that from 3 to 55 pph of fumed silica be present in the small particulate component. Fumed silica has a secondary particulate size of approximately 1 micron, with each secondary particle consistent of about 200 primary particles. A principal characteristic of fumed silica is its extremely large surface area of approximately 200 square meters per gram. This makes this component of the filler useful for reinforcing the end product wiper blade.

In addition or in replacement of the fumed silica, precipitated silica can be used. In preferred compositions, from 0 to 36 pph precipitated silica may be in the filler. As precipitated silica replaces fumed silica, relatively more precipitated silica should be used.

The relatively low molecular weight hydroxyl-ended polydimethylsiloxane can be thought as not a primary silicone constituent of the silicone polymer gum, but instead as a process aid for coating the fumed and precipitated silica. The hydroxyl-ended polydimethylsiloxane reacts with the silica surface to keep down hydrogen bonding. It coats the filler surface. Otherwise, the added small particulate filler makes the composition too hard.

The high molecular weight silicone polymers and the filler preferably accounts for at least ninety percent of the weight of the wiper blade composition. Other components in a preferred composition include a stabilizing agent that controls additional, unwanted vulcanization due to heat. Such a stabilizer is cerium octoate present in a concentration between 0.3 and 1.6 pph. The stabilizer does not interfere with the initial vulcanization, but instead stabilizes the composition under warm or hot conditions.

Another additive is a vulcanization catalyst which can, for example, consist of either a peroxide catalyst or a platinum catalyst. A peroxide catalyst can be used, such as 2,4-dichlorobenzoyl peroxide, in a concentration ranging from about 2.7 to about 3.2 pph. Dicumylperoxide can also be used as a vulcanization catalyst. A platinum-based catalyst can be substituted for the peroxide catalyst, but if this is done, much less of is used, typically on the order of 5 to 100 parts per million, and more preferably 10 to 20 parts per million. Silane may be present in the compositions in the range of 0.6 to 1.0 pph. An anti-acid additive may also be used such as magnesium oxide, zinc oxide, amphoteric aluminum oxide or other base to counteract the acid breakdown products of the peroxide catalyst. Where a peroxide catalyst is used, the antiacid additive should be present in the composition in the range of 0.6 to 1.2 ph.

Finally, the composition may include pigment, which can range from 0.2 to 20 pph. A more preferred range of pigmentation is 0.6 to 2.7 pph. These pigments should be peroxide-insensitive pigments where a peroxide vulcanization catalyst is used, and may comprise inorganic oxides, or alternatively certain organic compounds where extremely bright colors are desired.

The compositions according to the invention have an unusual capability of being brightly colored, as they do not have to be black or dark colored in order to shield the composition from ultraviolet radiation. Further, the pigmentation may take place of some of the filler, with the inorganic colored oxides being particularly appropriate for this purpose.

One convenient method of measuring relative filler content is the specific gravity of the wiper blade. FIG. 1 is a graph of wiper blade specific gravity versus frictional force of the wiper blade with respect to glass. Prior art silicone rubber wiper constructions, such as those disclosed in the Hyer patents previously described, have a specific gravity in the range of 1.1 to 1.2. Such wiper blades, as previously explained, have a relatively low filler content and exhibit frictional force problems. It has been discovered that a wiper blade having a specific gravity of 1.3 is approximately the lower limit of wiper blades which can perform satisfactorily. The specific gravity of the wiper blades according to the invention should be in the range of 1.3 to 1.7, and preferably should fall within the range of 1.45 to 1.65. The specific gravity of the wiper blade climbs as more siliceous or calcareous filler is added to it, because these substances are heavier than the largely polydiorganosiloxane elastomer gum in which they are dispersed.

The wiper blades according to the invention are designed to be used as replacements for conventional natural rubber automotive wiper blades, or as originally equipped in substitution for such wiper blades. Such wiper blades generally have a length of approximately 10 to 20 inches and a contact width of about 0.1 inch, yielding a squeegee blade/glass surface contact area of approximately one to two square inches. The coefficient of friction of the compositions has been arrived at with this amount of contact surface area in mind. It has been found that wipers which exhibit a coefficient of friction greater than about 2.8 grams per gram weight are unacceptable because of motor loading, squeaking or chatter. The wiper blades according to the invention, on the other hand, have a lower frictional force of about 2.4 to 2.7 grams per gram weight. These wiper blades perform much better, as will be described in more detail below.

Structure

The inventors have fabricated wiper blades which exhibit excellent characteristics in part because of a synergism of their composition, their structural profile and the method of their manufacture. Therefore, they describe below some of the structural characteristics of the wipers that yield such excellent results.

In FIG. 2, a perspective view of a wiper blade according to the invention is shown generally at 10. The body of wiper blade 10 includes a wiper superstructure containing element indicated generally at 11, and a squeegee blade 12. The superstructure retaining element 11 includes a thin neck 14, and a relatively thick or wide flange 16.

The squeegee blade 12 varies in thickness between a thick base 18 and a relatively thin squeegee blade end 20. In a preferred embodiment, each side 22 of the squeegee blade 12 is inwardly arcuate from the base 18 to the tip 20. The squeegee blade 12 extends axially in a first direction from the thin neck 14, and is opposed to the relatively thick wiper superstructure retainer flange 16.

Figure 5:
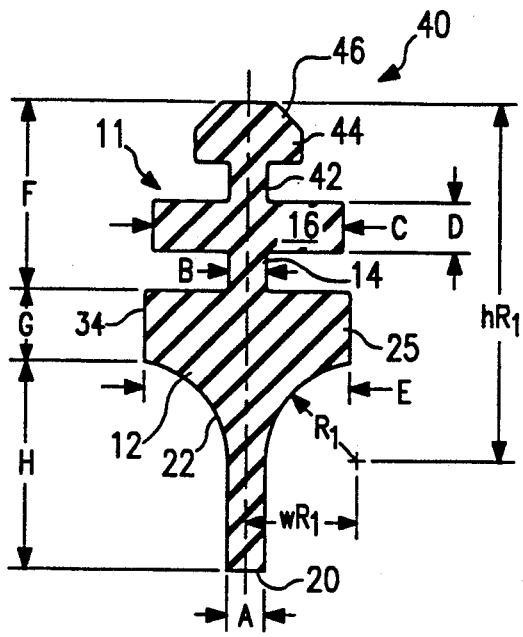
FIG. 5 is a cross-sectional view of a third embodiment of a wiper blade according to the invention.

FIGS. 3, 4 and 5 show cross-sectional views of different embodiments of wiper blades manufactured according to the invention. As shown in each of FIGS. 3, 4 and 5, each blade 10 includes a superstructure joining or retaining portion 11, a squeegee blade 12 and a preferably flat wiping edge 20. Like parts are given the same numbers in these drawings.

As shown in FIG. 3, the retainer 16 is defined by a restricted neck 14 formed by longitudinal grooves 23 at opposite sides of the neck 14. The longitudinal grooves 23 extend throughout the length on opposite sides thereof thereby providing the opposite sides of the neck 18 with an outwardly extending flange or retainer 16. The length of the edge 20 extends the length of the wiper blade.

Dimensions A, B, C, D, E, F, G and H as well as radii $R_1$ and $R_2$ and radius offsets $hR_1$ and $wR_1$ are found in Table I below for the wiper blade shown in FIG. 3. Dimensions B, C and D and F are primarily determined according to the structure of the vehicle wiper superstructure and spline. Dimensions A, H, $R_1$, $R_2$, $hR_1$, and $wR_1$ are chosen to give optimum design and wipe quality, and may vary according to the wiper blade composition. For example, length dimensions G and H would be made relatively longer for stiffer compositions, or for compositions having polydiorgano-siloxanes with a larger proportion of vinyl side groups in them or having larger amounts of small-sized particulate fillers. The end thickness A will also vary, as will the thickness E of the base 12, according to the relative resiliency of the cured composition.

TABLE I

| Blade Profile | Dimension, in | | | | | | | |
|---|---|---|---|---|---|---|---|---|
| | A | B | C | D | E | F | G | H |
| FIG. 3 | .035 | .034 | .180 | .045 | .210 | .140 | .079 | .231 |
| FIG. 4 | .038 | .035 | .110 | .040 | .230 | .100 | .070 | .275 |
| FIG. 5 | .035 | .040 | .220 | .050 | .230 | .195 | .060 | .230 |

| Blade Profile | $R_1$ | $hR_1$ | $wR_1$ | $R_2$ |
|---|---|---|---|---|
| FIG. 3 | .236 | .420 | .229 | .100 |
| FIG. 4 | .246 | .364 | .261 | — |
| FIG. 5 | .125 | .377 | .142 | — |

Referring now to FIG. 4, another embodiment indicated generally at 30 of the wiper blade is shown.

In this embodiment, the superstructure retaining flange 16 is substantially more narrow than the embodiment shown in FIG. 2. A top wall 32 of the wiper blade base 25 downwardly slopes from the sidewall 34 to the thin neck 14, instead of being at right angles to the wall of the neck 14 and the sidewall 34. Dimensions A through H and $R_1$ are given in Table I for this embodiment.

FIG. 5 discloses a third embodiment 40 of a wiper blade according to the invention. The preferred dimensions of this wiper blade are given in Table I. In addition to a first superstructure retaining flange 16, wiper blade 40 has a second thin neck 42 of approximately the same dimension as the first thin neck 14, and a second flange 44. The flange 44 has beveled corners 46. The length of the neck 42 between the first flange 16 and the second flange 44 is preferably about 0.045 inches. The thickness of the second flange 44 is preferably 0.055 inches while the thickness of the unbeveled top portion of the second flange 46 is approximately of the same dimension as the thicknesses of neck 42 and 14.

Figure 6:
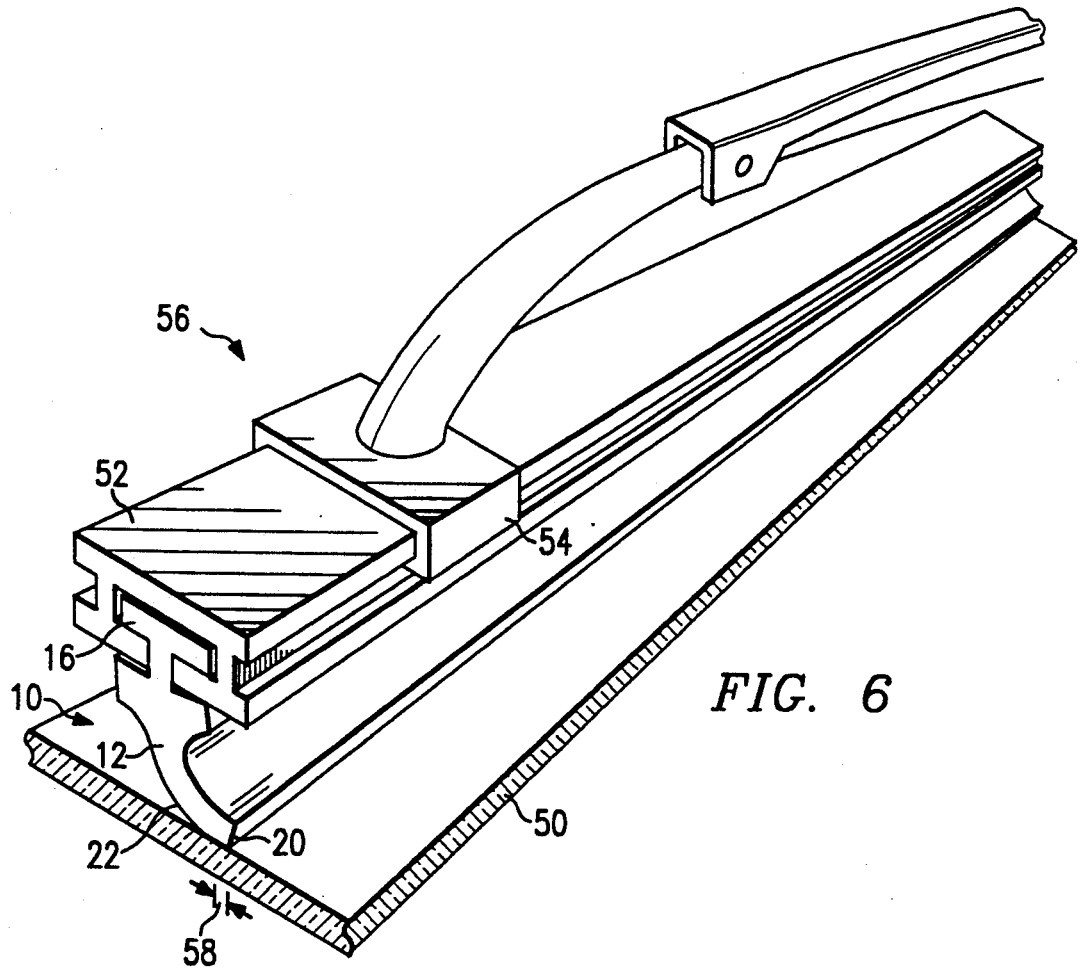
FIG. 6 is a perspective view of the wiper blade depicting the action of the wiping edge in contact with a windshield glass.

Referring to FIG. 6, an isometric view of wiper blade 10 is shown, as wiping a glass surface 50. Flange 16 is shown retained within a channeled spline 52, which in turn is held by a claw 54 of a wiper arm superstructure indicated schematically and generally at 56. As the wiper blade wipes across the glass surface, the blade 12 will deform until a certain width 58 of the leading arcuate sidewall 22 is in contact with the glass 50. As previously described, the compositions according to the invention have been formulated for a width 58 of approximately 0.1 inch. Since the wiper 12 is on the order of 10 to 20 inches long for conventional automotive applications, the total surface area is approximately one to two square inches. The coefficient of friction of the wiper blade of about 2.4 to 2.7 g/g wt. is chosen with this amount of surface area in mind.

Process

Several, but not all, wiper blades according to the invention are preferably made by the process fully disclosed in U.S. Pat. No. 4,981,637, or alternatively, the process disclosed in U.S. Pat. No. 4,904,434, both of which are incorporated herein by reference.

Figure 7:
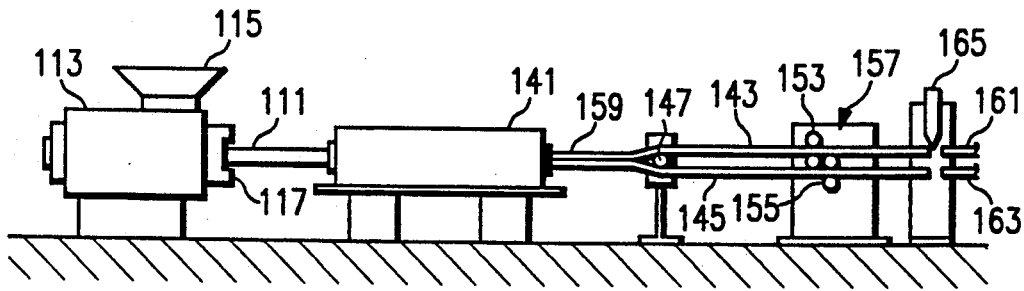
FIG. 7 is a simplified, schematic view of an overall process according to the invention.

Referring to FIG. 7, the first step in the method of forming a wiper blade is to extrude a continuous length of a curable elastomer 111 from an extruder 113.

The extruder 113 for the extrusion step is a conventional extruder having a hopper 115 which feeds into a hot cylinder. The heat softens the elastomer and it is forced by one or more spiral screws (not shown) out through a die 117 having a die orifice. The die orifice forms the cross-sectional shape of the continuous mass of elastomer as it passes through in conventional fashion. Extrusion processes of the type described are well known in the art and discussed, for example, in Lynch, W., *Handbook of Silicone Rubber,* and L. K. Arnold, *Introduction To Plastics,* Iowa State University Press, 1968, pages 46–49.

Figure 8:
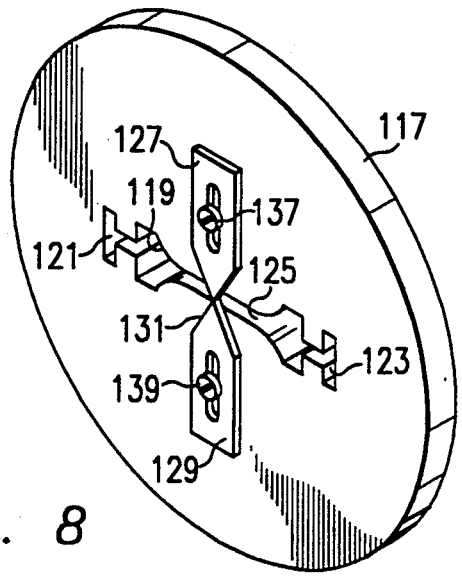
FIG. 8 is an isolated view of the extrusion die used in the extrusion step of the process of FIG. 7.

FIG. 8 is a detailed view of the special die 117 used in the practice of a method according to the invention. The die 117 includes a die opening 119 which is shaped to produce a pair of wiper blades 121, 123 joined at a mid-section 125 thereof in edge-to-edge relation.

The die 117 also includes an adjustable scoring mechanism, such as adjustable blades 127, 129. The blade tips 131 are not in contact but are spaced apart a preselected distance to score the continuous length of elastomer along the top and bottom surfaces 133, 135 thereof to a depth less than the thickness of the continuous length of elastomer. The blades 127, 129 can be adjusted by means of screws 137, 139 mounted on the die which are carried in vertical slots provided in the blades.

The continuous length of extruded elastomer 111 which has been scored at the die 117 is then passed to a curing station. For instance, in the embodiment shown in FIG. 7, the curing station is a continuous vulcanizer 141. As will be familiar to those skilled in the art, the continuous vulcanizer 141 can employ, for instance, a liquid medium such as a eutectic salt bath through which the elastomer is drawn. The salt bath contains a liquid salt at a temperature from about 350° to 450° F. The viscosity of the salt at operating temperatures will be similar to water.

It will be apparent that instead of the preferred salt bath continuous vulcanizer 141, any continuous vulcanizable method can be used. For instance, the vulcanizing step can as easily be performed by a hot air vulcanizing tunnel. Also, the continuous length of elastomer 111 could be cured without a heat activated catalyst, as by using infrared radiation or gamma radiation techniques familiar to those skilled in the art. It is only necessary that the previously formed and scored curable elastomer be cured such that the material can be divided and formed as subsequently described.

After curing, the continuous length of curable elastomer 111 is separated into two separate lengths of wiper blade 143, 145 by allowing one length 143 to travel over a fixed nip roller 147 while the second length 145 is pulled under the same roller 147. The beginning separation can be done by hand with the ends 149, 151 being engaged by roller pairs 153, 155 of a puller 157.

Preferably, the continuous length of scored elastomer 159 is separated by pulling over nip roller 147 while the elastomer is at an elevated temperature above ambient. Leaving the extruder 113, the curable elastomer 111 is typically at a temperature in the range from about 90°–100° F. The continuous vulcanizing step then typically raises the temperature to a higher elevation above ambient. For instance, in the case of a salt bath or hot air vulcanizing tunnel, the exiting material 159 would be at an elevated temperature on the order of 300°–450° F. The preferred temperature for the scored elastomer 159 at the separating roller 147 is in the range from about 100°–300° F., most preferably about 200° F. The decrease in temperature between the continuous vulcanizer 141 and the separating roller 147 can be achieved by exposure to the ambient atmosphere, pulling through a water trough with water at ambient temperature or by the use of air jets if necessary.

The separate continuous lengths of wiper blade 143, 145 are then cut transversely into individual wiper-sized segments 161, 163 by a conventional cutter 165.

Figure 9:
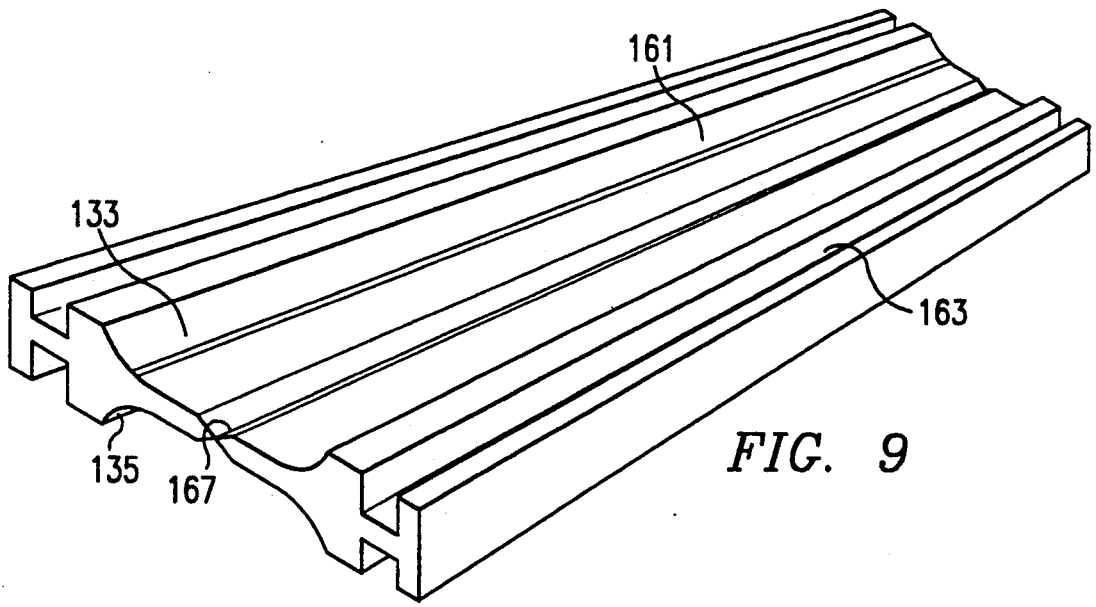
FIG. 9 is a perspective view of a pair of wiper blades formed by the process of FIG. 7.

FIG. 9 is a perspective view of a pair of wiper-sized segments 161, 163, the segments being separated by an opening 167 located at the approximate mid-section which formerly represented the score line prior to separation at the nip roller 147.

Figure 10:
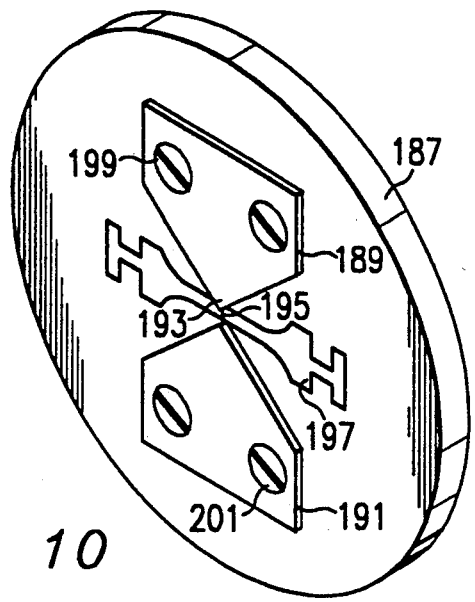
FIG. 10 is an isolated view of another embodiment of the extrusion die used in the extrusion step of the process of FIG. 1.
Figure 11:
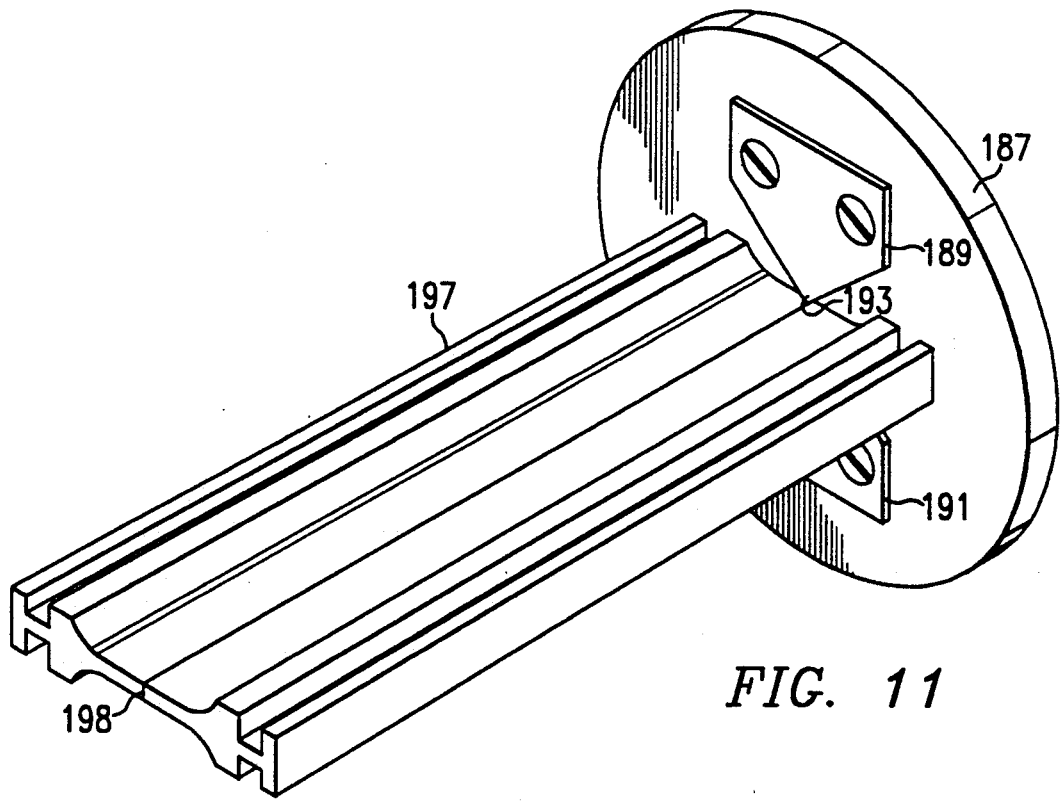
FIG. 11 is a perspective view of a pair of wiper blades exiting the extrusion die of FIG. 10 showing the preformed mid-section of the continuous length of extruded elastomer.

FIG. 10 shows another embodiment of the extrusion die used in the method of the invention. In this embodiment, the die 187 includes blades 189, 191, the blade tips 193 of which are not in contact but are spaced apart a preselected distance. In this case, however, a preforming means, such as wire 195, extends between the blades 189, 191 to preform the mid-section of the extruded elastomer 197 by weakening the mid-section thereof. The blades 189, 191 are fixed on the die face by means of screw sets 199, 201, with wire 195 being, for instance, tack welded thereon. The preforming means could also comprise, for instance, a KEVLAR blade arranged between the die blades 189, 191. We found that by passing the raw extruded elastomer through the die 187 and preforming means 195, the elastomer reunites, or tacks together, immediately after passing the wire 195 to form a continuous length of elastomer with a weakened midsection 198. FIG. 11 shows the elastomer 97 exiting the die 187 with the weakened mid-section 198 being clearly visible. The continuous length of uncured, extruded elastomer 197 is then passed to a curing station and cured in the manner previously discussed.

After curing, the continuous length of curable elastomer 197 is separated into two separate lengths of wiper blade, i.e., lengths 143, 145 in FIG. 7 by allowing one length 143 to travel over a fixed nip roller 147 while the second length 145 is pulled under the same roller 147. The lengths can then be engaged by roller pairs 153, 155 of a puller 157, as previously discussed. The elastomer 197 separates along the preformed mid-section 198 into separate lengths of wiper blade having improved edge quality. The extrusion process allows a continuous length of blade to be formed at a lower cost than previous molding techniques.

The fabrication process described in conjunction with FIGS. 10 and 11 is useful for wiper blades having a specific gravity of less than or equal to about 1.40. For blade compositions having a specific gravity of greater than 1.40, the extrusion process is modified such that no KEVLAR wire or filament 195 is used to preform a weakened midsection. Instead, the blades are extruded and are passed directly to the continuous vulcanizer 141 (FIG. 7). Thereafter, the blades are separated not by the nip rollers are shown, but by a circular blade. As separated, the blades are cut transversely by a conventional cutter 165.

EXAMPLES

EXAMPLE 1

A compound was formulated having three silicone polymer constituents, siliceous fillers and certain other additives, as set forth in Table II below. The silicone polymer constituents included a 75.2 parts by weight of a polymer A, 24.8 parts by weight of a polymer B, with polymer A and polymer B forming 100 parts by weight of the gum. Polymer A was dimethylvinyl-siloxy-ended polydiorganosiloxane having 99.8% methyl groups and 0.2% by weight vinyl groups as percentages of all organic radicals in the gum. The viscosity of polymer A is controlled to be not less than 5000 centistokes at 25° C. Polymer B was dimethylvinylsiloxy-ended polydimethylsiloxane with a viscosity at or above 500,000 centistokes at 25° C. Polymers A and B had a molecular weight of at least one million. Polymer C, a structure control fluid or process aid, consisted of hydroxyl-ended polydimethylsiloxane with a viscosity between 5 and 100 centistokes and a molecular weight between 1000 and 10,000. This compound was used to extrude wiper blades having the cross-section shown in FIG. 2 and with the dimensions shown in Table I. The wiper blades were extruded according to the process described in conjunction with FIGS. 7, 10 and 11.

TABLE II

| Constituent | pph |
| --- | --- |
| Polymer A | 75.2 |
| Polymer B | 24.8 |
| Polymer C | 9.9 |
| Fumed Silica | 54.5 |
| Silane | 1.0 |
| Cerium Octoate Stabilizer | 1.6 |
| Anti-Acid Additive | 1.2 |
| Ground Quartz | 25.0 |
| 2,4-Dichlorobenzoylperoxide | 2.8 |
| Pigment | 0.6 |
| Specific Gravity = 1.30 | |

These wipers were tested on conventional automobile glass using conventional windshield wiper motors. The wipers were engaged to dry windshield glass for one half hour. The wiper system functioned continuously for this one half hour without stalling or tripping of a 7 ampere maximum motor circuit breaker. During this time, the current varied between a minimum of 4.1 amperes in the maximum of 6.8, the voltage remained constant at 12.5 volts and the wiper speed and counts per minute varied between 57 at the start and 48 at the conclusion of the test.

The elements or vertebrae did not show any breakage or permanent distortion after removal of the respective proof loads in this test. The arm loads were 25 on the left arm and 24.5 on the right arm. The wipers made no objectionable squeaking, chattering or other noise during the dry glass test.

No squeaking, chattering or other noise was encountered during tests on wet or damp dry glass. The drag coefficient was less than 1.75 in three different tests.

The wipers were subjected to an accelerated ozone resistance test by placing in an ozone chamber. No cracks appeared in the wipers even after 96 hours under an ozone-rich atmosphere.

The wipers were also subjected to a permanent set simulation test after 24 hours at 500° F. After this exposure, the elements flipped over appropriately without chatter in each of five samples. The elements were also tested for chemical resistance to methyl and isopropyl alcohol by placing them in 50% aqueous solutions of these alcohols, and in 100% alcohol baths, for hours. The blades, in order to pass, were to not have exceeded more than 2% weight change. In the 50% methyl alcohol solution, the actual weight change was 0.09%, while in 50% isopropyl alcohol, the weight change was 0.04%. After being placed in 100% methyl and isopropyl alcohol, the weight changes were 1.3 and 1.9%, respectively, well below the 5% weight change threshold. In an ozone test, the blades after exposure showed no signs of discoloration or tears.

These wipers had a hardness of b 67°, a tensile strength of 850 psi, an elongation of 210%, and a tear strength of 95 psi. After having been aged for 48 hours at 500° F., the hardness of the wiper blades increased only to 70°, the tensile strength decreased only to 790 psi, and the elongation was 160%. In a compression set test for 22 hours at 350° F., the percentage compression set was 24%.

In a test to demonstrate oil resistance, the blades were immersed in ASTM#1 oil for 70 hours at 302° F. After this test, the blades exhibited a hardness of 63°, a tensile strength of 860 psi and an elongation of 190%.

EXAMPLE 2

A second formulation was mixed and had the constituents shown in Table III.

TABLE III

| Constituent | pph |
| --- | --- |
| Polymer A | 55.2 |
| Polymer B | 44.8 |
| Polymer C | 9.1 |
| Precipitated Silica | 35.7 |
| Fumed Silica | 3.1 |
| Ground Quartz | 130.3 |
| Silane | 0.6 |
| Cerium Octoate Stabilizer | 0.3 |
| Anti Acid Additive | 0.6 |
| 2,4-Dichloro Benzoyl Peroxide | 3.2 |
| Pigment | 0.6 |
| Specific Gravity = 1.55 | |

As compared to the formulation of Example 1, a larger amount of polymer B was used and a smaller portion of polymer A, yielding a wiper blade of greater flexibility. This formulation largely replaces the fumed silica shown in Example 1 with precipitated silica. The of ground quartz was increased from 25 to 130 parts by weight. This formulation was used to extrude a wiper blade having the profile shown in FIG. 3. The wiper blade had a specific gravity of 1.55, and exhibited good wipe quality in a relatively low coefficient of friction. The specific gravity of the wiper blade of Example 1 was 1.30. In this example, the wiper blades were extruded according to the above-described process, except that circular knives were used to effect separation between each blade pair after curing.

EXAMPLE 3

A third formulation was made for a multi-bladed wiper having a cross-section substantially as shown in U.S. Pat. No. 4,473,919 issued to Fritz, Jr., which patent is incorporated herein by reference. The relative amounts by weight of the constituents are shown in Table IV.

TABLE IV

| Constituent | pph |
| --- | --- |
| Polymer A | 70 |
| Polymer B | 30 |
| Polymer C | 6.7 |
| Fumed Silica | 21.3 |
| Ground Quartz | 196.7 |
| Cerium Octoate Stabilizer | 0.3 |
| 2,4-Dichlorobenzoylperoxide | 2.7 |
| Pigment | 2.7 |
| Specific Gravity = 1.65 | |

This formulation yielded a cured wiper blade having a specific gravity of 1.65. The blade exhibited good wipe quality and a low coefficient of friction.

In summary, novel silicone polymer wiper blade compositions and methods of manufacture have been disclosed that yield extremely durable wiper blades having good wipe quality and acceptable coefficients of friction.

While the present invention has been described with the aid of the above detailed description and the examples, the invention is not limited thereto but only by the scope and spirit of the appended claims.

What is claimed is:

1. A silicone windshield wiper blade capable of inexpensive manufacture and having good wipe quality, and exhibiting a coefficient of friction with respect to glass in the range of 2.4 to 2.7 grams/g.wt. inclusive, comprising
   about 100 parts by weight of a vulcanizable elastomeric including at least one silicone polymer; and
   about 75 to 220 parts by weight of a filler dispersed in said elastomer and selected from the group consisting of siliceous materials, calcareous materials and mixtures thereof, said filler including from 25 to 200 parts by weight of a first filler having an average particle diameter in the range of 5 to 100 microns and from 20 to 55 parts by weight of a second filler having an average particle diameter of less than 5 microns such that the specific gravity of the wiper blade falls within the range of 1.3 to 1.7.

2. The wiper blade of claim 1, wherein said silicone polymer is a polydiorganosiloxane.

3. The wiper blade of claim 2, wherein said polydiorganosiloxane has vinyl groups only on its ends.

4. The wiper blade of claim 2, wherein said polydiorganosiloxane has a minor portion of phenyl side groups.

5. The wiper blade of claim 2, wherein said silicone polymer is dimethylvinylsiloxy-ended polydiorganosiloxane.

6. The wiper blade of claim 5, wherein said polydiorganosiloxane has organo side groups consisting of between 0.02 and 1.0 weight percent vinyl, and the remainder methyl.

7. The wiper blade of claim 6, wherein said organo side groups consist essentially of between 0.1 and 0.3 weight percent of vinyl, and the remainder methyl.

8. The wiper blade of claim 1, wherein said vulcanizable silicone polymer elastomer comprises
   a major portion of dimethylvinylsiloxy-ended polydiorganosiloxane, said polydiorganosiloxane having organic side groups consisting of 0.02 to 1 weight percent vinyl and remainder methyl, and having a molecular weight on the order of one million; and
   a minor portion of dimethylvinylsiloxy-ended polydimethylsiloxane having a molecular weight on the order of one million.

9. The wiper blade of claim 8, and further comprising a third polymer consisting of hydroxyl-ended polydimethylsiloxane having a viscosity in the range of 5 to 100 centistokes.

10. The wiper blade of claim 2, wherein said polydiorganosiloxane has organic side groups including from 0.1 to 0.3 weight percent vinyl, and the remainder methyl.

11. The wiper blade of claim 1, wherein said silicone polymer, prior to vulcanization, has a major portion of saturated side groups and a minor portion of unsaturated side groups.

12. The wiper blade of claim 11, wherein said silicone polymer, prior to vulcanization, has 99.8% by weight saturated side groups and 0.2% by weight unsaturated side groups.

13. The wiper blade of claim 11, wherein said silicone polymer, prior to vulcanization, has from 99.00% to 99.98% by weight methyl side groups.

14. The wiper blade of claim 11, wherein said silicone polymer has from 0.02% to 1.0 weight percent vinyl side groups.

15. The wiper blade of claim 1, wherein said second filler comprises smaller siliceous particles having a surface area of about 200 square meters/gram.

16. The wiper blade of claim 15, wherein said small siliceous particles consists of fumed silica.

17. The wiper blade of claim 1, wherein said second filler is selected from the group consisting of fumed silica, precipitated silica and mixtures thereof.

18. The wiper blade of claim 17, wherein said second filler is from 20 to 55 parts fumed silica relative to 100 parts by weight of the elastomer.

19. The wiper blade of claim 17, further including, relative to 100 parts by weight of the elastomer, about 3 to about 10 parts by weight of hydroxyl-ended polydimethylsiloxane having a molecular weight between 1000 and 10,000.

20. The wiper blade of claim 19, wherein the ratio of parts by weight of said second filler to parts by weight of said hydroxyl-ended polydimethylsiloxane is in the range of 3:1 to 12:1.

21. The wiper blade of claim 20, wherein said ratio is about 6 to 1.

22. The wiper blade of claim 1, wherein said second filler includes from 0 to 36 parts by weight of precipitated silica.

23. The wiper blade of claim 1, wherein said first filler is selected from the group consisting of ground quartz, celite, chalk and mixtures thereof.

24. The wiper blade of claim 23, wherein said first filler consists of relatively large sized particles having diameters in the range of about 5 to about 30 microns.

25. The wiper blade of claim 23, wherein said first filler includes from about 130 to about 200 parts by weight of ground quartz.

26. The wiper blade of claim 1, further comprising, relative to 100 parts by weight of said elastomer, about one part by weight of silane.

27. The wiper blade of claim 1, further comprising, relative to 100 parts by weight of said elastomer, from 0.3 to 1.6 parts by weight of cerium octoate.

28. The wiper blade of claim 1, further including, relative to 100 parts by weight of said elastomer, about 0.6 to 1.2 parts by weight of an anti-acid additive.

29. The wiper blade of claim 1, further comprising a minor portion of vulcanizing catalysts selected from the group consisting of platinum catalysts and peroxide catalysts.

30. The wiper blade of claim 29, wherein said peroxide catalyst is selected from the group consisting of 2,4-dichlorobenzoyl peroxide and dicumyl peroxide.

31. The wiper blade of claim 30, further comprising a minor portion of peroxide insensitive pigment.

32. The wiper blade of claim 1, further comprising, relative to 100 parts by weight of said elastomer, from 0.6 to 2.7 parts by weight of a pigment.

33. The wiper blade of claim 1, wherein said wiper blade has a specific gravity of 1.55.

34. The wiper blade of claim 1, wherein said silicone polymer has a viscosity before vulcanization of not less than 500,000 centistokes at 25° C.

35. A windshield wiper blade exhibiting a coefficient of friction with respect to glass in the range of 2.4 to 2.7 grams/g.wt. inclusive, having the following composition
   about 100 parts by weight of a silicone polymer elastomer including at least one polydiorganosiloxane; and
   about 75 to 220 parts of a filler dispersed in said elastomer, said filler including from 25 to 200 parts by weight of a first filler having particle diameters in the range of 5 to 100 microns and from 20 to 55 parts by weight of a second filler having particle diameters of less than 5 microns said first filler including particles of a substance having a coefficient of friction with respect to glass that is substantially less than the coefficient of friction with respect to glass of said polydiorganosiloxane, such that the specific gravity of the wiper blade falls in the range of 1.3 to 1.7.

36. A wiper blade, comprising
   a vulcanizable silicone polymer elastomer, a first constituent of said elastomer consisting of a polydiorganosiloxane having a minor portion of unsaturated side groups and a major portion of saturated side groups, a second constituent of said elastomer consisting of a polydiorganosiloxane having essentially all saturated side groups, a third constituent consisting of a hydroxyl-ended polydiorganosiloxane having essentially all saturated side groups; and
   a first filler of siliceous or calcareous particles having an average particle size in the range of 5 microns to 100 microns, and present in the range of 25 to 200 parts by weight relative to 100 parts of said silicone polymer elastomer and a second filler of siliceous or calcareous particles having an average particle size of less than 5 microns and present in the range of 20 to 55 parts by weight, said wiper blade having a specific gravity in the approximate range of 1.3 to 1.7 and a coefficient of friction of about 2.4-2.7 grams/g.wt. as applied to standard automotive windshield glass.

37. A wiper blade having a specific gravity between 1.3 and 1.7 and a coefficient of friction with respect to glass in the range of 2.4 to 2.7 grams/g.wt. comprising
   about 100 parts by weight of a vulcanizable silicone polymer elastomer including at least one polydiorganosiloxane;
   about 25 to 200 parts by weight of a first particulate filler dispersed in said elastomer and having an average particle diameter between 5 and 100 microns and selected from the group consisting of ground quartz, chalk, celite and mixtures thereof, said particles dispersed filler formed of a substance having a coefficient of friction with respect to glass that is substantially less than said polydiorganosiloxane polymers; and
   about 20 to 55 parts by weight of a second particulate filler dispersed in said elastomer and having an average particle diameter of less than 5 microns.

* * * * *

UNITED STATES PATENT AND TRADEMARK OFFICE
CERTIFICATE OF CORRECTION

PATENT NO. : 5,283,927
DATED : February 8, 1994
INVENTOR(S) : Robert M. Gibbon and Michael L. Hyer It is certified that error appears in the above-indentified patent and that said Letters Patent is hereby corrected as shown below:

On the title page, and Col. 1, line 2, delete "silicon" and insert "silicone"

Col. 1, line 12, delete "having" and insert "have";
Col. 2, line 10, insert "catalyst" after "vulcanizing";
Col. 5, line 46, insert a dash ("-") before 100°F and 130°F to show the correct temperature to be -100°F to -130°F;
Col. 6, line 45, insert "it" before the second occurrence of the word "is";
line 54, insert "p" before "ph" so as to read "pph";
Col. 10, line 24, delete "out" and insert "cut";
Col. 11, line 6, delete "are" and insert "as";
line 22, delete "5000" and insert "500,000";
Col. 12, line 22, delete the letter "b";
line 59, insert "amount" before "of";
Col. 13, line 39, delete "elastomeric" and insert "elastomer":

Col. 14, lines 13 & 14, delete "polydiorganosiloxanehas " and insert --polydiorganosiloxane--.

Line 36, delete "consists" and insert --consist--

Signed and Sealed this

Twenty-eight Day of March, 1995

Attest:

BRUCE LEHMAN

Attesting Officer    Commissioner of Patents and Trademarks